(12) United States Patent
Alecu et al.

(10) Patent No.: US 11,530,649 B2
(45) Date of Patent: Dec. 20, 2022

(54) HYBRID GAS TURBINE ENGINE AND TORQUE TRANSFER ASSEMBLY THEREFORE

(71) Applicant: PRATT & WHITNEY CANADA CORP., Longueuil (CA)

(72) Inventors: Daniel Alecu, Brampton (CA); David Menheere, Norval (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 73 days.

(21) Appl. No.: 17/216,909

(22) Filed: Mar. 30, 2021

(65) Prior Publication Data
US 2022/0316403 A1 Oct. 6, 2022

(51) Int. Cl.
*F02C 7/36* (2006.01)
*F02C 6/20* (2006.01)

(52) U.S. Cl.
CPC ............ *F02C 7/36* (2013.01); *F02C 6/206* (2013.01); *F05D 2220/323* (2013.01); *F05D 2220/76* (2013.01); *F05D 2260/402* (2013.01)

(58) Field of Classification Search
CPC ...... F02C 3/04; F02C 7/32; F02C 7/36; F02C 6/206; F05D 2220/323; F05D 2220/76; F05D 2220/32; F05D 2220/36; F05D 2260/402
See application file for complete search history.

(56) References Cited

U.S. PATENT DOCUMENTS

| 2,560,644 | A | 7/1951 | Hartzell | |
|---|---|---|---|---|
| 5,244,348 | A | 9/1993 | Karls et al. | |
| 6,249,070 | B1* | 6/2001 | Sharp | B60R 16/027 310/90.5 |
| 7,411,328 | B2 | 8/2008 | Snelick et al. | |
| 8,100,666 | B2* | 1/2012 | Makuszewski | F01D 25/16 29/889.1 |
| 8,651,741 | B2* | 2/2014 | Malinin | F16C 17/024 384/103 |
| 9,297,422 | B2 | 3/2016 | Barnett et al. | |
| 2006/0078420 | A1* | 4/2006 | Barbe | F01D 17/162 415/159 |
| 2013/0014513 | A1 | 1/2013 | Barnett et al. | |

* cited by examiner

*Primary Examiner* — Audrey B. Walter
*Assistant Examiner* — Dapinder Singh
(74) *Attorney, Agent, or Firm* — Norton Rose Fulbright Canada LLP

(57) ABSTRACT

The torque transfer assembly can include a sleeve having an elongated internal opening, a shaft having an elongated body extending in the internal opening of the sleeve, a first coupler at a first end of the elongated body coupled to a gas turbine engine rotor, and a second coupler at a second end of the elongated body coupled to a generator, the second coupler opposite the first coupler relative to a length of the elongated body, the shaft being made of a metal, and a bushing extending around the elongated body of the shaft, trapped between the shaft and the sleeve, the bushing made of plastic, the bushing having a coefficient of thermal expansion greater than a coefficient of thermal expansion of the sleeve.

19 Claims, 6 Drawing Sheets

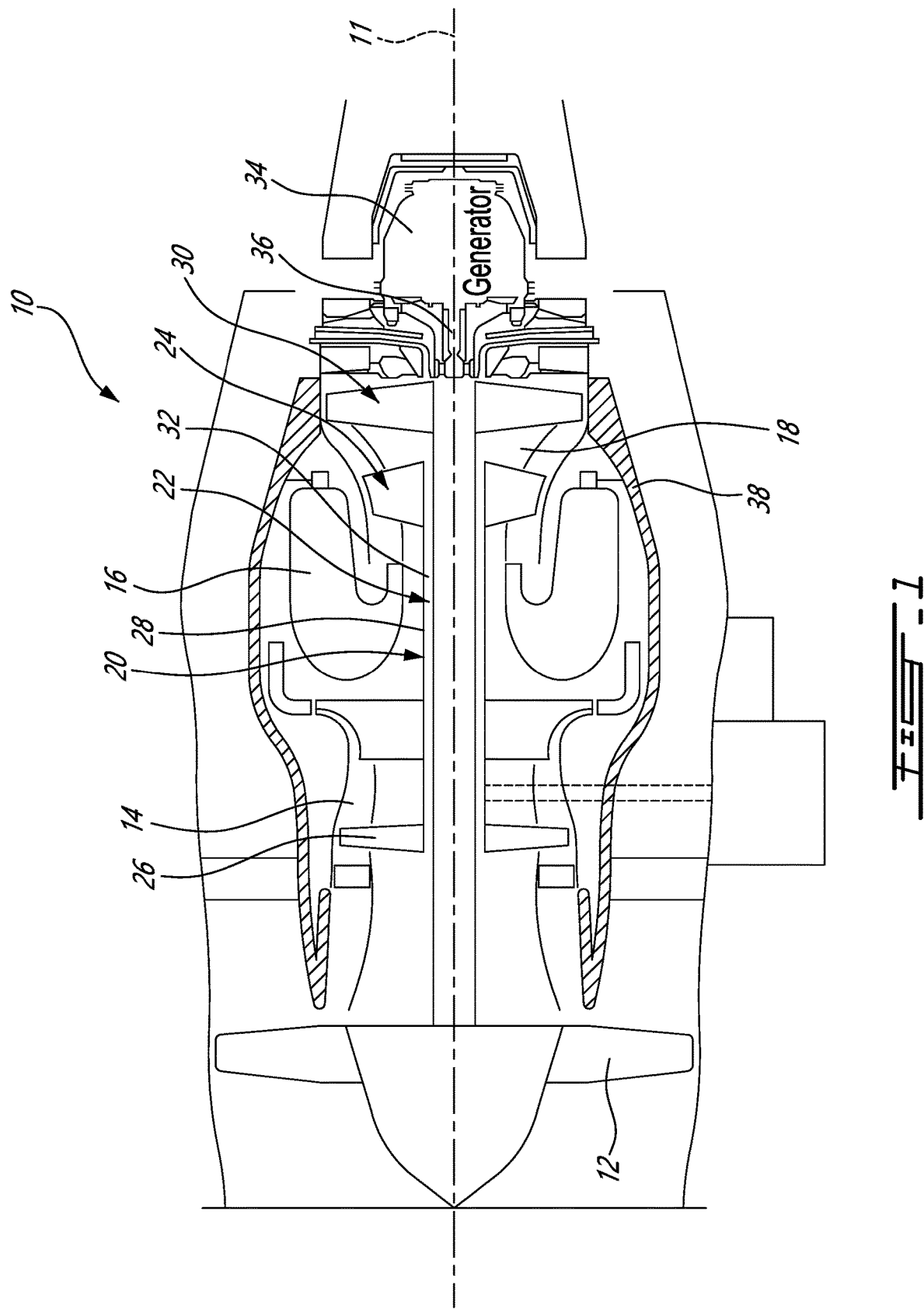

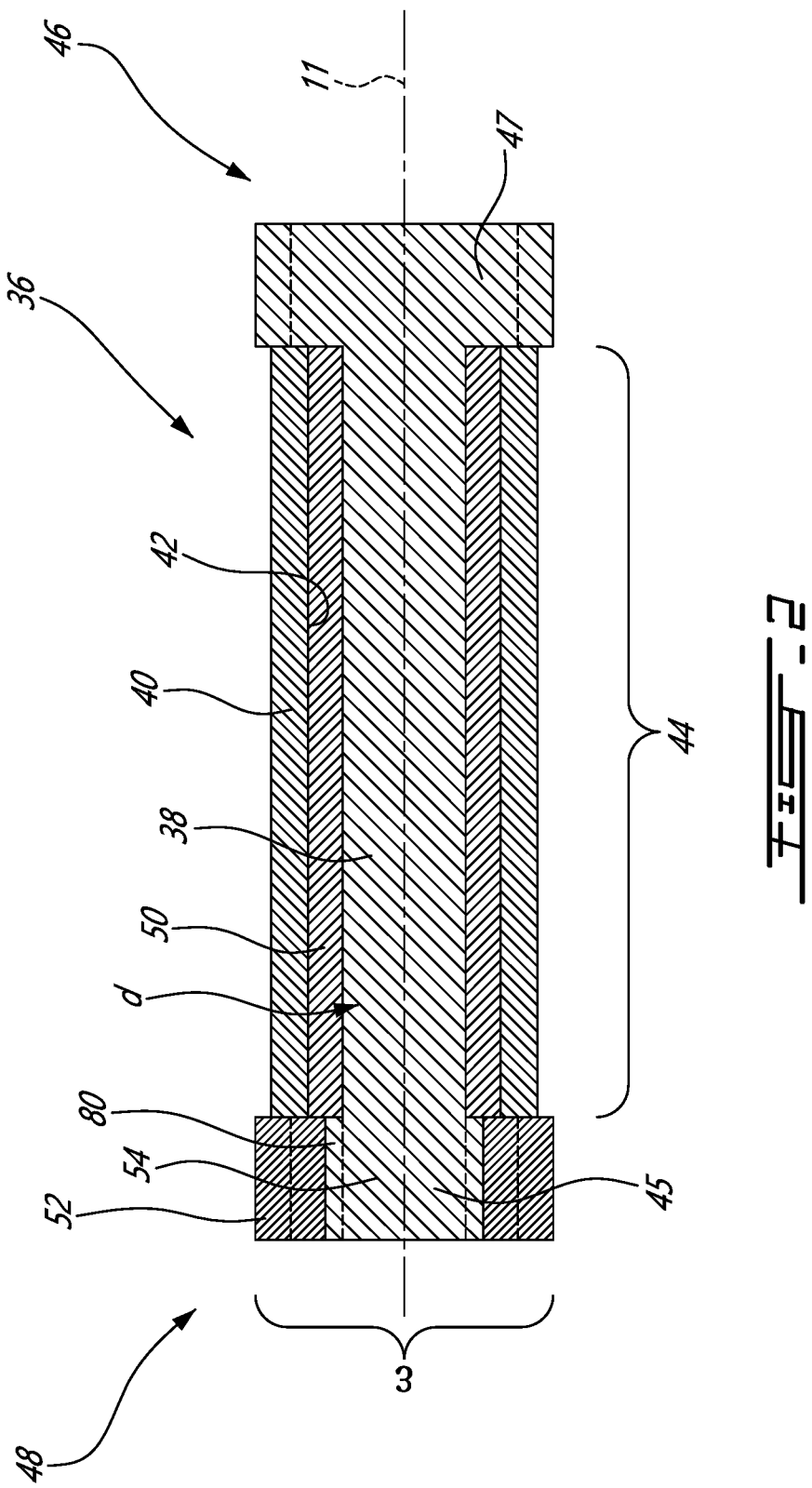

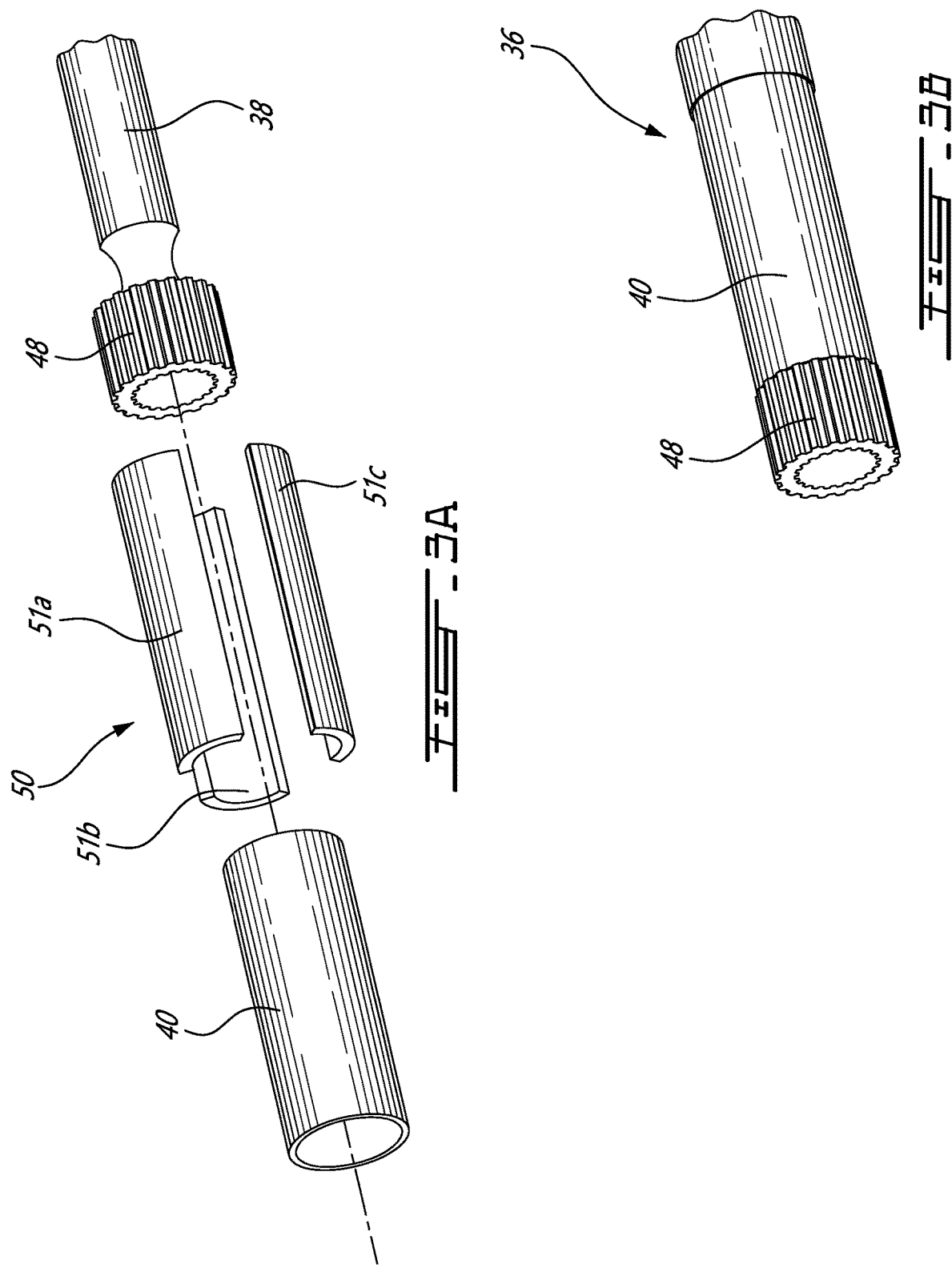

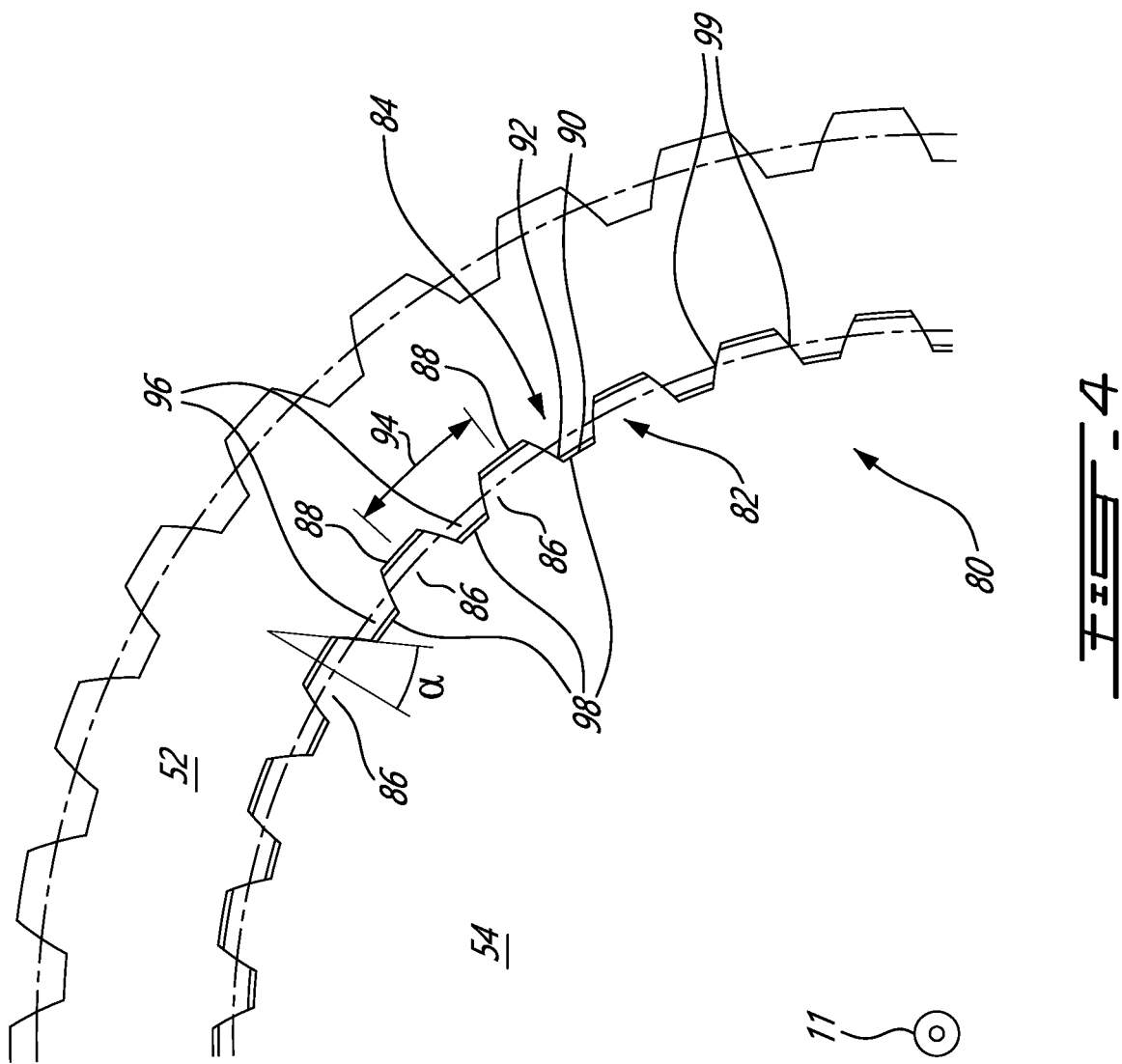

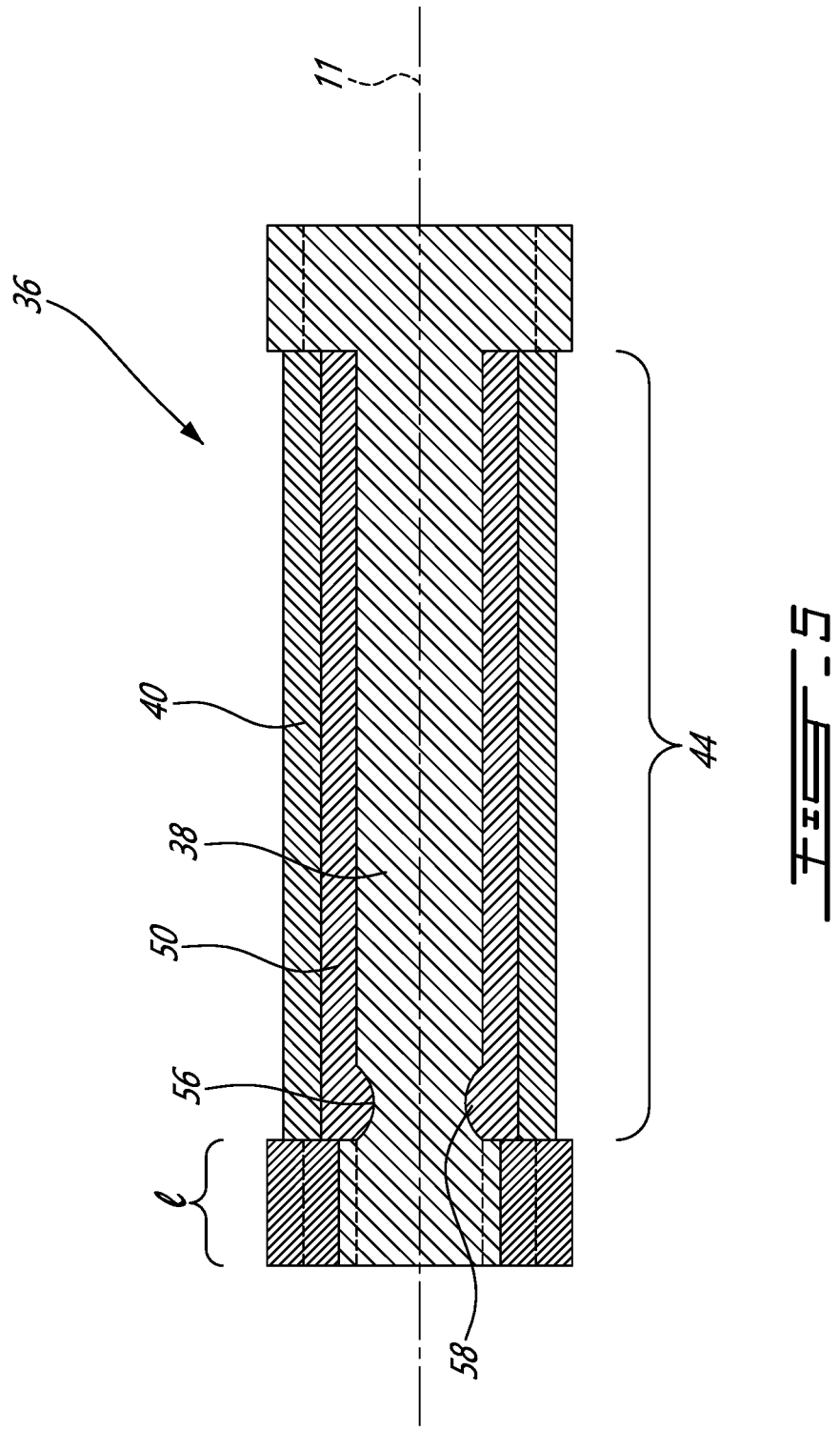

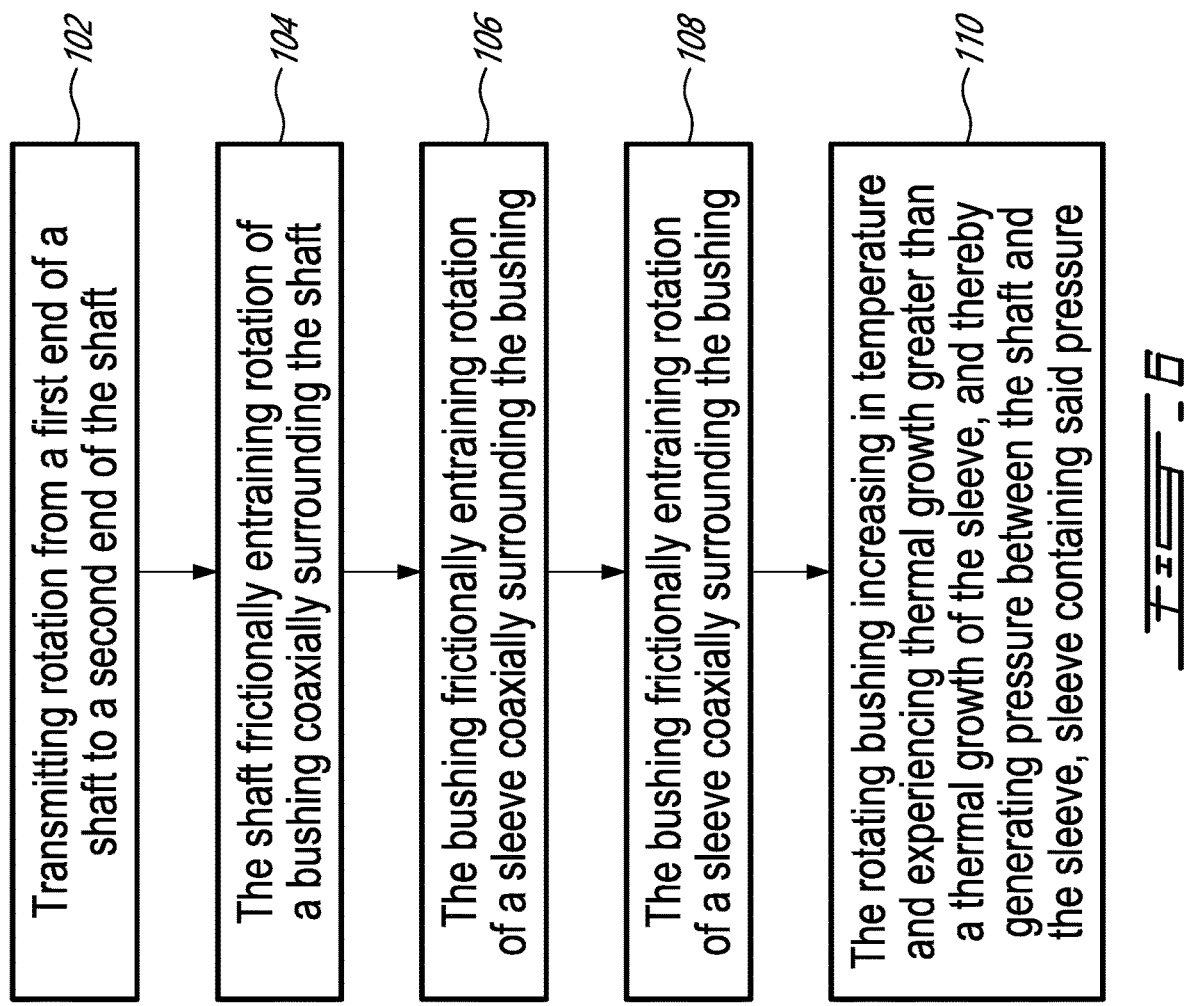

US 11,530,649 B2

HYBRID GAS TURBINE ENGINE AND TORQUE TRANSFER ASSEMBLY THEREFORE

TECHNICAL FIELD

The application relates generally to gas turbine engines and, more particularly, to hybrid gas turbine engines.

BACKGROUND OF THE ART

Hybrid gas turbine engines typically have a generator connected to a rotor of the engine core. The generator can be controlled in a manner to extract power from the engine core in the form of electricity and store it in a battery, when suitable conditions exist. Such a condition can exist, for instance, when operating the engine core at a point of higher fuel efficiency generates more power than the current power requirements of the aircraft, which can happen during cruise or descent, for instance.

In such hybrid gas turbine engines, one possible configuration is to position the generator in axial alignment with the engine core, and to use a quill shaft to allow torque transfer therebetween. Indeed, even though the generator can be constrained to a rough axial alignment with the engine core via a casing of the engine, the structure has a given level of flexibility and can deform (e.g. bend to a certain degree within the elastic deformation domain) in different operating conditions, which may lead to limited variations of alignment between the engine core and the generator which the torque transfer arrangement needs to accommodate. Even though quill shafts offered torque transfer with some degree of accommodation to alignment variations, and were therefore satisfactory to a certain degree, there remained room for improvement.

SUMMARY

In one aspect, there is provided a torque transfer assembly comprising a sleeve having an elongated internal opening, a shaft having an elongated body extending in the internal opening of the sleeve, a first coupler at a first end of the elongated body, and a second coupler at a second end of the elongated body, the second coupler opposite the first coupler relative to a length of the elongated body, the shaft being made of a metal, and a bushing extending around the elongated body of the shaft, trapped between the shaft and the sleeve, the bushing made of plastic, the bushing having a coefficient of thermal expansion greater than a coefficient of thermal expansion of the sleeve.

In another aspect, there is provided a gas turbine engine comprising: a gas turbine engine core comprising an annular gas path extending sequentially across a compressor, a combustor, and a turbine, the annular gas path extending around a rotor shaft, a generator having a power port, a torque transfer assembly having a shaft having a first end coupled to the rotor shaft, and a second end opposite the first end, the second end coupled to the power port, a bushing engaged around the shaft, the bushing made of plastic, and a sleeve engaged around the bushing, the sleeve having a coefficient of thermal expansion lower than a coefficient of thermal expansion of the bushing.

In a further aspect, there is provided a method of transferring torque, the method comprising: transmitting rotation from a first end of a shaft to a second end of the shaft, the shaft frictionally entraining rotation of a bushing coaxially surrounding the shaft, the bushing frictionally entraining rotation of a sleeve coaxially surrounding the bushing, the rotating bushing increasing in temperature and experiencing thermal growth greater than a thermal growth of the sleeve, and thereby generating pressure between the shaft and the sleeve, said sleeve containing said pressure.

DESCRIPTION OF THE DRAWINGS

Reference is now made to the accompanying figures in which:

FIG. 1 is a schematic cross-sectional view of a gas turbine engine;

FIG. 2 is a cross-sectional view of an example torque transfer assembly;

FIG. 3A is an oblique view, exploded, of a torque transfer assembly;

FIG. 3B is an oblique view of the torque transfer assembly of FIG. 3A shown assembled;

FIG. 4 is a cross-sectional view taken along lines 4-4 of FIG. 2;

FIG. 5 is a cross-sectional view of an example torque transfer assembly;

FIG. 6 is a flow chart of an example method of operation of a torque transfer assembly.

DETAILED DESCRIPTION

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases around the engine axis 11, and a turbine section 18 for extracting energy from the combustion gases.

Gas turbine engines can have a plurality of rotors. In the illustrated embodiment, for instance, the gas turbine engine 10 has a high pressure rotor assembly 20 and a low pressure rotor assembly 22. The high pressure rotor assembly 20 can include a high pressure turbine disc assembly 24 and a compressor disc assembly 26, interconnected to one another by a high pressure shaft 28. The low pressure rotor assembly 22 can include a low pressure turbine disc assembly 30 and the fan 12, interconnected to one another by a power shaft 32. The gas turbine engine 10 is hybrid in the sense that it has an electric machine embodied here as a generator 34. Different builds of gas turbine engines can have significantly different engine configurations. For example, in turboprop and turboshaft applications, the power shaft can connect to a propeller or to helicopter blades, respectively, and the fan and bypass path can be absent. In some gas turbine engines, more than two rotors may be used. Such other engine builds can also benefit from the use of a generator in some embodiments, or may benefit from torque transfer techniques between another combination of components than an engine shaft and a generator. In the illustrated embodiment, both rotor assemblies 20, 22 are concentric around a main axis 11, the generator 34 connects to the power shaft 32 via a torque transfer assembly 34, all of which are generally axially aligned with the main axis 11. More specifically, the torque transfer assembly 34 connects to a power port (coupler) of the generator 34, and the power port can either correspond to the main rotor shaft of the generator 34, or be connected to the main rotor shaft of the generator 34 via suitable gearing, depending on the embodiment.

In the illustrated embodiment, the generator 34 is constrained to a rough axial alignment with the power shaft 32 via a structure 38 of the engine. The structure 38 has a given level of flexibility and can deform (e.g. bend to a certain degree) in different operating conditions, which may lead to limited, but nonetheless significant, variations of alignment between the power shaft 32 and the generator 34 which the torque transfer assembly 36 is designed to accommodate. In one embodiment, the torque transfer assembly can include a torque transfer shaft having couplers such as splines or sprockets at both ends. The coupler arrangement typically limits the allowable degree of angular deflection. So-called "wet splines", which use a continuously cycling supply of oil to form a controlled spacing between the matching spline members, can provide a greater degree of angular deflection than dry splines, but still carry a certain limit in terms of degree of angular deflection. Using a longer torque transfer shaft can allow to accommodate larger structural deflections within the limits of the allowable degree of angular deflection.

Such a torque transfer arrangement is subject to dynamic considerations in addition to static considerations. Indeed, using a relatively long torque transfer shaft in combination with a relatively heavy rotor shaft 32 may lead to a relatively low frequency torsional resonance. Such a low frequency torsional resonance may interfere with the generator voltage control requirements. Indeed, in some embodiments, generator voltage control may apply an increased excitation current in the case of a speed drop, leading to a ΔTorque/ΔSpeed <0 of the load, which may be an indicator of potential system instabilities or torsional oscillation buildup likely to lead to generator disconnect or other failure. Accordingly, although increasing the length of the torque transfer shaft can appear as a suitable solution to accommodate angular deflection, this approach may not be suitable in some embodiments, given that increasing the length of the torque transfer shaft can entrain a decrease in stiffness if all other variables remain the same.

Another potential solution is increasing the shaft diameter in order to increase the shaft stiffness. However, such approach can have a snowball effect in some embodiments: shaft increased weight and potentially increased vibration (e.g. flailing), increased generator bearing diameter thus increased weight and losses, increased generator rotor diameter and possible limited maximum speed, etc.

It was found that the inconveniences associated to increasing the length of the shaft could be alleviated, at least in some embodiments, by using adding a sleeve around the shaft, and a plastic bushing trapped between the sleeve and the shaft.

An example of a torque transfer assembly 36 having a greater stiffness and torsional damping for a given length and diameter of the shaft 38 is presented in FIG. 2. More specifically, the sleeve 40 has an elongated internal opening 42 which, in this embodiment, is a cylindrical opening extending across the entire length of the cylindrical wall forming the sleeve 40. The shaft 38 also has an elongated body, a portion 44 of which extends in the internal opening 42 of the sleeve 40. The shaft 38 has a first coupler 46 at a first end 47, and a second coupler 48 at a second end 49, opposite the first coupler 46 relative to the length of the elongated body. The exact choice of coupler will depend on the specific embodiment, and the couplers 46, 48 can be splines or sprockets, for instance, and can be similar or different at both ends 47, 49. The shaft 38 is made of metal, such as steel for instance. The bushing 50 extends around the elongated body of the shaft 38, and is radially trapped between the shaft 38 and the sleeve 40. It can also be longitudinally (axially) trapped by the couplers 48, 46 at both ends 47, 49. The bushing 50 can be of a plastic having a greater thermal expansion coefficient than the sleeve 40, in a manner that during operation, the sleeve 40 and shaft 38 act as a pressure vessel to the bushing 50, and the constrained bushing 50 creates a torque link between the external sleeve 40 and the shaft 38. The sleeve 40 can contain the pressure including by deforming in a manner which is limited to the elastic deformation domain. In such a configuration, the torque path continues to extend from one end 47 of the shaft 38 to the other end 49 of the shaft 38, and the shaft 38 can be made entirely of a metal such as steel, while the bushing 50 and the sleeve 40 contribute to providing additional stiffness and/or damping in the dynamic context of the overall assembly 36. Typically, the bushing 50 and sleeve 40 can contribute to both additional stiffness and damping, in proportions which can vary or be tuned as a function of the context of different embodiments. It was found that in some embodiments, the presence of the bushing 50 and sleeve 40 can increase the torsional resonance frequency in a manner to raise it suitably above the interference frequency of the voltage controller.

The plastic can be a high temperature plastic, e.g. a plastic which substantially maintains its mechanical properties at temperatures over 150° C., or even over 250° C. The thermal expansion coefficient of the plastic can be significantly greater than the thermal expansion coefficient of the sleeve 40, such as more than 3 times, preferably more than 5 times, and possibly around 7 times the thermal expansion coefficient of the sleeve 40 if the sleeve 40 is made of metal, and possibly even more if the sleeve is made of a material such as carbon fiber. The bushing 50 can be fitted tight over the an elongated portion 44 of the body of the shaft 38. The sleeve 40 can be fitted tight over the bushing 50. When the assembly 36 reaches the nominal running temperature, the plastic expands and can exert significant pressure on the shaft 38 (compression which tends to improve shaft HCF life) and the sleeve 40 (tension which exceeds the sleeve hoop stress due to the centrifugal force) such that the plastic bushing 50 can be maintained in intimate contact with the shaft 38 and the sleeve 40. The bushing 50 and the sleeve 40 working in unison with the shaft 38 can increase the torsional stiffness. The proposed arrangement may significantly improve the shaft HCF life by avoiding prolonged torsional "ringing" due to load change thus allowing a thinner shaft/shear neck thus further reducing the shaft weight and balancing requirements. Because of the plastic increase loss tangent/energy dissipation, the apparent shaft damping coefficient may be increased. The sleeve 40 can be designed in a manner to resist the pressure exerted by the bushing 50, including the creeping stress of the plastic, for example, and during operation, the tension in the sleeve can be above the hoop stress of the sleeve.

Different types of plastic may be more or less suited to different embodiments. High temperature plastics such as polyether ether ketone (PEEK—a colourless organic thermoplastic polymer in the polyaryletherketone family) or polyimide (with or without fillers such as graphite, PTFE and molybdenum disulfide, such as sold under the trademark VESPEL®), can be suitable in some embodiments. Because of the plastic increase loss tangent/energy dissipation, the apparent shaft damping coefficient may be increased by a factor of 5 (polyimide) to more than 20 (PEEK). Polytetrafluoroethylene (PTFE) may also form a suitable choice of plastic in some embodiments. Depending on the embodiment, the thickness of the bushing relative to its length can vary. In some embodiments, it can be preferred for the thickness of the wall of the bushing to be between 10 and 100 times less than the total length of the bushing, and in some embodiments, it can be preferred for the thickness of the wall of the bushing to be between 20 and 50 times less than the total length of the bushing, for instance.

The relative amplitude of the additional stiffness and damping effects which can be afforded by the use of the bushing 50 and the sleeve 40 on the elongated portion 44 of the shaft 38 can be tuned in view of specific embodiments to a given extent. The tuning can involve selecting a given plastic material in view of a specific embodiment. Moreover, while the bushing 50 can be continuous around the shaft in some embodiments and be monolithic, it may be preferred to use a bushing made up of a plurality of circumferentially distributed, axially-oriented segments 51*a*, 51*b*, 51*c* in some embodiments, such as shown in FIG. 3. Indeed, the plastic bushing 50 may be monolithic or may be segmented along the axis. Segmenting the bushing in two or more segments 51*a*, 51*b*, 51*c* can be used, for instance, in embodiments where it is desirable to keep a relatively low torsional stiffness but provided a more significant amount of damping. During operation, the segments 51*a*, 51*b*, 51*c* can be immediately circumferential adjacent, abut and rub against each other due to the differential angular deflection created by the torque, thus dissipating energy. The heating of the plastic material can increase the device internal pressure thus the friction force between the segments 51*a*, 51*b*, 51*c*. The assembly 36 can exhibit increasing damping with increasing torsional strain.

The particulars of the sleeve 40 and bushing 50 lengths can vary depending on the embodiment. In the embodiment illustrated in FIG. 2, for instance, the sleeve 40 and the bushing 50 have the same length, which corresponds to the length of the elongated portion 44, and both the sleeve 40 and the bushing 50 are terminated at both ends by the the couplers 46, 48. In alternate embodiments, the lengths of the sleeve 40 and/or of the bushing 50 can alternately be terminated by other features of the rotor shaft, generator, or associated couplings, to name some examples. Typically, such features will tightly trap the sleeve 40 and bushing 50 axially, but in still other embodiments, it may not be required to tightly trap the sleeve and bushing in the axial orientation, and some degree of axial movement relative to the shaft may be tolerated.

In some embodiments, the couplers 46, 48 at both ends 47, 49 of the shaft 38 can be wider than the elongated portion 44 of the shaft 38, and in such cases, one may need to think about how the sleeve 40 and bushing 50 will be engaged onto the elongated portion 44 of the shaft 38 to form the torque transfer assembly 36. In some cases the bushing 50 can simply be over moulded onto the shaft 38 and, if the couplers 46, 48 have an external width w which is greater than the external diameter d of the shaft 38, but smaller than the internal opening 42 of the sleeve 40, the sleeve 40 can simply be slid over the coupler 48 and onto the bushing 50. In the embodiment presented in FIG. 2 and in FIG. 3, the width w of the couplers 48, 46 is greater than the internal opening 42 of the sleeve, and so the sleeve 40 cannot be slid around either one of the couplers 48, 46. To this end, one or both of the couplers 46, 48 can have a two-part construction, including an adapter head 52 bearing the torque transfer coupling features, the adapter head 52 being engaged around a smaller hub portion 54 of the shaft 38, for instance. Torque transfer functionality can be assured between the hub portion 54 and the adapter head 52 via a spline engagement 80, for instance.

FIG. 4 shows this latter scenario in greater detail. In this embodiment, the hub portion 54 of the shaft 38 is full and has a generally cylindrical outer surface bearing a male spline 82. The adapter head 52 is generally cylindrically annular, and has an inner surface bearing a female spline 84 adapted to engage the male spline 82 of the hub 54 into the configuration shown. The torque transfer coupling feature, selected in this embodiment to be a male spline, is embodied in the radially outer surface of the adapter head 52, here also in the form of a spline. As discussed above, the nature of the torque transfer coupling feature can vary depending on the embodiment, and the torque transfer coupling feature can be a male or female spline or sprocket, to name some examples, in alternate embodiments.

In the embodiment presented in FIGS. 2 and 3, the spline engagement 80 has a male spline 82 provided as part of the shaft, and a female spline 84 provided as part of the adapter head. Both the male spline 82 and the female spline 84 can be said to extend around and along the axis 11. The female spline 84 receives the male spline 82 axially, into the spline engagement, and otherwise said, the male spline 82 is axially engaged into the female spline 84 at assembly to remain axially engaged therewith during operation of the gas turbine engine.

As known in the art, and as depicted more explicitly in FIG. 3, a spline engagement 80 can involve the mating engagement of circumferentially crenellated features which will be referred to herein as keys 86 and grooves 88. The keys 86 can be seen as axially elongated features which protrude radially from an otherwise cylindrical radially outer surface 90, and the grooves 88 can be seen as axially elongated features which are radially recessed from an otherwise cylindrical radially inner surface 92. Each one of the keys 86 is radially engaged in a corresponding one of the grooves 88. The engagement can be relatively tight circumferentially to allow the torque-transmitting spline engagement 80 around the axis 11 during operation, while allowing the axial sliding engagement at assembly due to the common axial orientation. The keys 86 can be said to be circumferentially interspaced from one another such as the grooves 88. Axially elongated refers to an axial length which is greater than, and typically greater than twice or more, the circumferential width. In this embodiment, the circumferential width essentially corresponds to the pitch 94, which is the distance between circumferentially adjacent keys 86 or grooves 88, which creates a geometry where the spacing between grooves 88 defines inversed keys 96 and the spacing between the keys 86 defines inversed grooves 98, with the inversed keys 96 having essentially same dimensions (width, radial depth) as the keys 86 and the inversed grooves 98 having essentially the same dimensions as the grooves 88, though oppositely oriented and adjusted to the annular geometry and required clearances. The circumferential spacing between adjacent keys and adjacent grooves can be constant and form a pitch 94. The grooves 88 and keys 86 can be said to have circumferentially and axially oriented bottoms and tips, respectively, and to extend between circumferentially opposite pressure faces 99 (aka pressure walls). The pressure faces 99 also extend axially and radially, but in some embodiments, such as the one illustrated, they can slope circumferentially inwardly from corresponding radial/axial oriented planes in the radially outward direction, at a pressure angle α. The pressure angle α can be of 30°, 45°, or of another angle in alternate embodiments. The pressure faces 99 can be planar, or curved (e.g. involute). Depending of the embodiment, the pitch diameter and the pitch 94 can vary, which can affect the number of keys 86 and grooves 88 in a specific embodiment. The number of keys 86 and grooves 88 can be of at least 10, at least 30, or at least 50, for instance. The specific details of the spline design such as pressure angle α, pitch 94, choice of straight or involute profile, pitch diameter (e.g. average diameter of the spline engagement 80), can be left to the designer in view of the specificities of corresponding embodiments.

In some embodiments, such as the embodiment illustrated in FIG. 5, the elongated portion 44 of the shaft 38 may be intentionally narrowed compared to the rest of the elongated portion, at a specific location, to form what is commonly referred to in the art as a shear neck 56, i.e. a favored location for the elongated shaft 38 to fail in shear (break). The shear neck 56 can be precisely designed to shear at a quite specific value of shear stress, and act somewhat as a fuse should undesired circumstances occur. In such embodiments, the bushing 50 may be molded over the shear neck 56 as an anti-flailing device, or otherwise provided with an internal bulge 58 conforming to the shape of the shear neck 56, which may be desirable for some applications. Also, the plastic bushing 50 and/or the sleeve 40 may engage with one or both of the torque transfer coupling features of the corresponding coupler(s).

Depending on the embodiment, the relative length of the shaft compared to its couplers can vary. The shaft 38 can be considered "long" when the length of its portion 44 corresponds to more than 7 times or more than 10 times the length l of the coupler, depending of the embodiment. The length of the portion 44 can be of at most 20 times the length l of the couplers in some embodiments. Depending on the embodiment, the portion 44 can be entirely unsupported, or supported by one or more bearing. In the illustrated embodiment, the portion 44 is entirely unsupported.

As presented in FIG. 6, a method of operating the torque transmission assembly 36 can include transmitting 102 rotation from a first end of a shaft to a second end of the shaft, the shaft frictionally entraining 104 rotation of a bushing coaxially surrounding the shaft, the bushing frictionally entraining 106 rotation of a sleeve coaxially surrounding the bushing, and the rotating bushing increasing 108 in temperature and experiencing thermal growth greater than a thermal growth of the sleeve, and thereby generating pressure between the shaft and the sleeve, said sleeve containing said pressure.

In embodiments where the bushing 50 is provided in the form of a plurality of segments 51a, 51b, 51c, the segments deform in a helical manner under torsion during operation and rub against one another, dissipating energy. The apparent shaft damping coefficient can vary depending of the embodiment and of the plastic used for the bushing, and can be increased by a factor of 5 in the case of polyimide, and by a factor of more than 20 in the case of PEEK.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, in some embodiments, the metal splines can be flood lubricated at each end of the quill shaft thus creating a "squeezed film" damper between the spline contact surfaces. Dry spline applications can be preferred in alternate embodiments. The proposed solution may apply to any arrangement, e.g. dry spline, hybrid spline or both end wet spline quill shaft. It is common for the generator end coupler to be a wet spline arrangement. While an embodiment of transferring torque between a generator and a gas turbine engine shaft is presented in FIG. 1, it will be understood that the torque transfer assembly presented herein may be useful in various other applications which can involve coupling a different combination of systems or devices to one another, and the teachings are thus not limited to hybrid gas turbine engine embodiments. The metal sleeve may be of the same material as the shaft or different in order to increase/decrease the pressure in the plastic bushing, e.g. the sleeve may be produced of carbon fiber which has a low expansion coefficient; such approach would result in a thinner bushing and lower overall weight. In embodiments presented above, the bushing and the sleeve are both of cylindrical annular configuration. In alternate embodiments, the bushing and the sleeve can have cross-sectional shapes other than circular, such as square, hexagonal, polygonal cross sections. Moreover, instead of having a constant cross-sectional dimension, the bushing can barrel and be thicker in an intermediate region than in the ends, for instance, and the sleeve can be shaped to accommodate this. Yet further modifications could be implemented by a person of ordinary skill in the art in view of the present disclosure, which modifications would be within the scope of the present technology.

The invention claimed is:

1. A gas turbine engine comprising:
   a gas turbine engine core comprising an annular gas path extending sequentially across a compressor, a combustor, and a turbine, the annular gas path extending around a rotor shaft,
   a generator having a power port, and
   a torque transfer assembly having
      a shaft having a first end coupled to the rotor shaft, and a second end opposite the first end, the second end coupled to the power port,
      a bushing engaged around the shaft, the bushing made of plastic,
      a sleeve engaged around the bushing, the sleeve having a coefficient of thermal expansion lower than a coefficient of thermal expansion of the bushing.

2. The gas turbine engine of claim 1 wherein the plastic is polyether ether ketone.

3. The gas turbine engine of claim 1 wherein the plastic is polyimide.

4. The gas turbine engine of claim 1 wherein the bushing extends continuously around the shaft.

5. The gas turbine engine of claim 1 wherein the bushing is provided in the form of two or more segments, each segment extending along the length of the shaft, the segments being disposed immediately adjacent one another around the shaft.

6. The gas turbine engine of claim 1 wherein the bushing has a coefficient of thermal expansion at least three times greater than the coefficient of thermal expansion of the sleeve and than the coefficient of thermal expansion of the shaft.

7. The gas turbine engine of claim 1 wherein the shaft has a first coupler at the first end, and a second coupler at the second end, wherein at least one of the first coupler and the second coupler has a spline.

8. The gas turbine engine of claim 1 wherein the shaft has a first coupler at the first end, and a second coupler at the second end, wherein at least one of the first coupler and the second coupler has an adapter head engaged around a hub portion of the shaft via a spline engagement.

9. The gas turbine engine of claim 1 wherein an elongated body of the shaft has a shear neck defined at a given location along a length of the elongated body.

10. The gas turbine engine of claim 9 wherein the bushing has an internal bulge conforming to the shape of the shear neck.

11. The gas turbine engine of claim 1 wherein the shaft has a first coupler at the first end, and a second coupler at the second end, wherein a length extending between the first coupler and the second coupler is of at least 10 times a length of either one of the first coupler and the second coupler.

12. The gas turbine engine of claim 1 wherein a thickness of the bushing is of at least 20 times smaller than a length of the bushing.

13. The gas turbine engine of claim 1 wherein an elongated body of the shaft has a full cylindrical shape, the bushing has a hollow cylindrical shape, and the sleeve has a hollow cylindrical shape.

14. The gas turbine engine of claim 1 wherein the sleeve is made of a metal.

15. The gas turbine engine of claim 14 wherein the generator has a voltage controller interference frequency and the torque transfer assembly has a torsional resonance frequency, the torsional resonance frequency being above the interference frequency.

16. A method of transferring torque from a generator to a gas turbine engine rotor, the method comprising:

transmitting rotation from a first end of a shaft coupled to the gas turbine engine rotor to a second end of the shaft coupled to the generator, the shaft frictionally entraining rotation of a bushing coaxially surrounding the shaft, the bushing frictionally entraining rotation of a sleeve coaxially surrounding the bushing, and the rotating bushing increasing in temperature and experiencing thermal growth greater than a thermal growth of the sleeve, and thereby generating pressure between the shaft and the sleeve, said sleeve containing said pressure.

17. The method of claim 16 wherein the bushing is composed of a plurality of circumferentially distributed segments around the shaft, further comprising the segments deforming helically around the shaft and rubbing against one another.

18. The method of claim 16 further comprising the bushing damping the torque at least 3 times more than the shaft.

19. The method of claim 16 further comprising the bushing damping the torque at least 15 times more than the shaft.

* * * * *